United States Patent
Chung

(10) Patent No.: US 9,998,302 B2
(45) Date of Patent: Jun. 12, 2018

(54) DIGITAL EQUALIZER AND DIGITAL EQUALIZING METHOD

(71) Applicant: KOREA UNIVERSITY RESEARCH AND BUSINESS FOUNDATION, SEJONG CAMPUS, Sejong-si (KR)

(72) Inventor: Hayun Cecillia Chung, Daejeon (KR)

(73) Assignee: KOREA UNIVERSITY RESEARCH AND BUSINESS FOUNDATION, SEJONG CAMPUS, Sejong-si (KR)

( * ) Notice: Subject to any disclaimer, the term of this patent is extended or adjusted under 35 U.S.C. 154(b) by 0 days. days.

(21) Appl. No.: 15/278,576

(22) Filed: Sep. 28, 2016

(65) Prior Publication Data

US 2017/0373888 A1    Dec. 28, 2017

(30) Foreign Application Priority Data

Jun. 23, 2016    (KR) .......................... 10-2016-0078384

(51) Int. Cl.
*H04L 25/03*    (2006.01)

(52) U.S. Cl.
CPC .. *H04L 25/03057* (2013.01); *H04L 25/03878* (2013.01)

(58) Field of Classification Search
CPC ......... H04L 25/03057; H04L 25/03878; H04L 25/03968; H04L 25/03885
See application file for complete search history.

(56) References Cited

U.S. PATENT DOCUMENTS

| 8,737,490 | B1 * | 5/2014 | Wilson | H04L 25/03343 |
| | | | | 375/244 |
| 9,240,912 | B1 * | 1/2016 | Giridharan | H04L 25/03057 |
| 9,705,708 | B1 * | 7/2017 | Jin | H04L 25/03885 |
| 2006/0049845 | A1 * | 3/2006 | Jaussi | H04L 25/03057 |
| | | | | 326/38 |
| 2012/0314756 | A1 * | 12/2012 | Leibowitz | H04L 25/03146 |
| | | | | 375/233 |
| 2015/0312061 | A1 * | 10/2015 | Toifl | H04L 25/03057 |
| | | | | 375/233 |

\* cited by examiner

*Primary Examiner* — Aristocratis Fotakis
(74) *Attorney, Agent, or Firm* — Hauptman Ham, LLP

(57) ABSTRACT

Provided is a digital equalizer which outputs a decision value corresponding to reception data transmitted from a data transmitter and is located in a data receiver. The digital equalizer includes at least one flip-flop which stores an adjacent bit sequence which is previous computing information; and a computing device which receives an output value of an analog to digital converter as a first input value, receives the adjacent bit sequence as a second input value, and outputs the decision value which is a binary value of the first input value by referring to a lookup table with respect to the first input value and the second input value.

13 Claims, 7 Drawing Sheets

DIGITAL EQUALIZER AND DIGITAL EQUALIZING METHOD

CROSS-REFERENCE TO RELATED APPLICATIONS

This application claims the priority of Korean Patent Application No. 10-2016-0078384 filed on Jun. 23, 2016, in the Korean Intellectual Property Office, the disclosure of which is incorporated herein by reference.

GOVERNMENT SUPPORT

This invention was made with Government support as follows:

| | |
|---|---|
| [Task Number] | 1345240815 |
| [Government] | Ministry of Education |
| [R&D Management] | Korea Research Foundation |
| [Project Name] | Science & Engineering Individual Basic Research Support |
| [Project Task Name] | DIGITAL EQUALIZER AND DIGITAL EQUALIZING METHOD |
| [Contribution Ratio] | 1/1 |
| [Responsible Institute] | Korea University Sejong Campus |
| [Research Period] | Nov. 1, 2015-Oct. 31, 2016 |

BACKGROUND

Field

The present disclosure relates to a digital equalizer and a digital equalizing method.

Description of the Related Art

A backplane receiver using an analog to digital converter (ADC) of the related art uses an algorithm in which a linear finite impulse response filter manner which has been used in an analog equalizer is introduced in a digital domain as it is even though a digital equalizer is introduced.

The linear algorithm depends on a linear equation, so that the performance of the equalizer may be significantly affected by a resolution of the analog to digital converter at a front end of the equalizer. In other words, the performance of the equalizer may be seriously deteriorated due to a quantization error of the analog to digital converter.

Therefore, a high resolution analog to digital converter is necessary. However, in order to support a backplane receiver whose communication speed is almost several tens of Gbps, a converter whose sampling speed is several tens of GS/s is necessary. It is difficult to implement a converter which operates at several tens of GS/s and also has a high resolution.

Actually, among converts having a sampling speed of 10 to 20 GS/s for backplane communication, a converter which has a resolution of 6-bit or higher has not been published. Most converters have too high power consumption, so that it is difficult to apply the converts to an actual receiver.

For this reason, in spite of various advantages (for example, application of an improved digital signal processing technology, insensitive to a noise or process parameter variation, reconstruction depending on a channel environment, or the like) of the structure of the backplane receiver based on the analog to digital converter, the backplane receiver has not been widely utilized.

As related prior art documents, Non-Patent Documents 1 to 5 are suggested below.

RELATED ART DOCUMENT

Non-Patent Document (Non-Patent Document 1) Harwood, M. et al.: A 12.5 Gb/s SerDes in 65 nm CMOS using a baud-rate ADC with digital receiver equalization and clock recovery, IEEE Int. Solid-State Circuits Conf., San Francisco, Calif., USA, February 2007, pp. 436-437, doi 10.1109/ISSCC.2007.373481

(Non-Patent Document 2) Cao, J. et al.: A 500 mW digitally calibrated AFE in 65 nm CMOS for 10 Gb/s Serial links over backplane and multimode fiber, IEEE Int. Solid-State Circuits Conf., San Francisco, Calif., February 2009, pp. 370-371, doi 10.1109/ISSCC.2009.4977462

(Non-Patent Document 3) Kim, J. et al.: Equalizer Design and Performance Trade-Offs in ADC-Based Serial Links, IEEE Trans. Circuits and Systems I, 2011, 58, (9), pp. 2096?2107, doi: 10.1109/TCSI.2011.2162465

(Non-Patent Document 4) Verma, S. et al.: A 10.3 GS/s 6b flash ADC for 10G Ethernet applications, IEEE Int. Solid-State Circuits Conf., San Francisco, Calif., USA, February 2013, pp. 462-463, doi 10.1109/ISSCC.2013.6487815

(Non-Patent Document 5) Shafik, A. et al.: A 10 Gb/s hybrid ADC-based receiver with embedded 3-tap analog FFE and dynamically-enabled digital equalization in 65 nm CMOS, IEEE Int. Solid-State Circuits Conf., San Francisco, Calif., USA, February 2015, pp. 62-63, doi 10.1109/ISSCC.2015.7062926

SUMMARY

An object to be achieved by the present disclosure is to provide a digital equalizer and a digital equalizing method which allow a low resolution analog to digital converter to be used at a front end of the digital equalizer, thereby remarkably reducing power consumption, design complexity, and a design area.

According to an aspect of the present disclosure, there is provided a digital equalizer which outputs a decision value corresponding to reception data transmitted from a data transmitter and is located in a data receiver. The digital equalizer includes at least one flip-flop which stores an adjacent bit sequence which is previous computing information; and a computing device which receives an output value of an analog to digital converter as a first input value, receives the adjacent bit sequence as a second input value, and outputs the decision value which is a binary value by referring to a lookup table with respect to the first input value and the second input value.

The lookup table may include a plurality of first probability values that the reception data for a plurality of first input values and a plurality of second input values, respectively, is a first level of binary value; and a plurality of second probability values that the reception data for the plurality of first input values and the plurality of second input values, respectively, is a second level of binary value.

When the first probability value for the first input value and the second input value is equal to or higher than the second probability value, the computing device may output the first level of binary value as the decision value.

The first probability value may be determined by dividing a value obtained by multiplying a third probability value that when the reception data has the first level of binary value, an output value of the analog to digital converter is the first input value and the adjacent bit sequence is the second input value and a fourth probability value that the reception data in random data has the first level of binary value by a value obtained by adding the third probability value and a fifth probability value that when the reception data has the second level of binary values, the output value of the analog to digital converter is the first input value and the adjacent bit sequence is the second input value.

The second probability value may be determined by dividing a value obtained by multiplying the fifth probability value and a sixth probability value that the reception data in the random data has the second level of binary value by a value obtained by adding the third probability value and the fifth probability value.

The digital equalizer may further include at least one register which is located between an output end of the analog to digital converter and a first input end of the computing device.

The computing device may receive a target output value of the analog to digital converter after passing through the at least one register as the first input and further receive a next output value of the analog to digital converter before passing through the at least one register as a third input value.

The lookup table may include a plurality of seventh probability values that reception data for a plurality of first input values, a plurality of second input values, and a plurality of third input values, respectively, has a first level of binary value and a plurality of eighth probability values that reception data for the plurality of first input values, the plurality of second input values, and the plurality of third input values, respectively, has a second level of binary value.

When the seventh probability value for the first input values, the second input values, and the third input values is equal to or higher than the eighth probability value, the computing device may output the first level of binary value as a decision value.

The seventh probability value may be determined by dividing a value obtained by multiplying a ninth probability value that when the reception data has the first level of binary value, the target output value of the analog to digital converter is the first input value, the adjacent bit sequence is the second input value, and the next output value of the analog to digital converter is the third input and a tenth probability value that reception data in random data has the first level of binary value by a value obtained by adding the ninth probability value and an eleventh probability value that when the reception data has a second level of binary value, the target output value of the analog to digital converter is the first input value, the adjacent bit sequence is the second input value, and the next output value of the analog to digital converter is the third input.

The eighth probability value may be determined by dividing a value obtained by multiplying the eleventh probability value and a twelfth probability value that the reception data in the random data has the second level of binary value by a value obtained by adding the ninth probability value and the eleventh probability value.

The ninth probability value may be determined by adding a value obtained by multiplying a thirteenth probability value that when the reception data has the first level of binary value and the next reception data has the first level of binary value, the target output value of the analog to digital converter is a first input value, the adjacent bit sequence is the second input value, and the next output value of the analog to digital converter is the third input and a fourteenth probability value that the next reception data in the random data has the first level of binary value and a value obtained by multiplying a fifteenth probability value that when the reception data has the first level of binary value and the next reception data has the second level of binary value, the target output value of the analog to digital converter is the first input value, the adjacent bit sequence is the second input value, and the next output value of the analog to digital converter is the third input and a sixteenth probability value that the next reception data in the random data has the second level of binary value.

The eleventh probability value may be determined by adding a value obtained by multiplying a seventeenth probability value that when the reception data has the second level of binary value and the next reception data has the first level of binary value, the target output value of the analog to digital converter is the first input value, the adjacent bit sequence is the second input value, and the next output value of the analog to digital converter is the third input and the fourteenth probability value and a value obtained by multiplying an eighteenth probability value that when the reception data has the second level of binary value and the next reception data has the second level of binary value, the target output value of the analog to digital converter is the first input value, the adjacent bit sequence is the second input value, and the next reception data of the analog to digital converter is the third input and the sixteenth probability value.

According to another aspect of the present disclosure, there is provided a digital equalizing method by a digital equalizer including a lookup table. The digital equalizing method includes receiving an output value of an analog to digital converter as a first input; receiving an adjacent bit sequence which is previous computing information output by the digital equalizer as a second input; and outputting a decision value which is a binary value of the first input by referring to the lookup table with respect to the first input and the second input.

The digital equalizing method may further include receiving a next output value of the analog to digital converter as a third input. In the outputting of a decision value, a decision value which is a binary value of the first input may be output by referring to the lookup table with respect to the first input, the second input, and the third input.

According to the present disclosure, the digital equalizer and the digital equalizing method may allow a low resolution analog to digital converter to be used at a front end of the digital equalizer, thereby remarkably reducing power consumption, design complexity, and a design area.

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Figure 1:
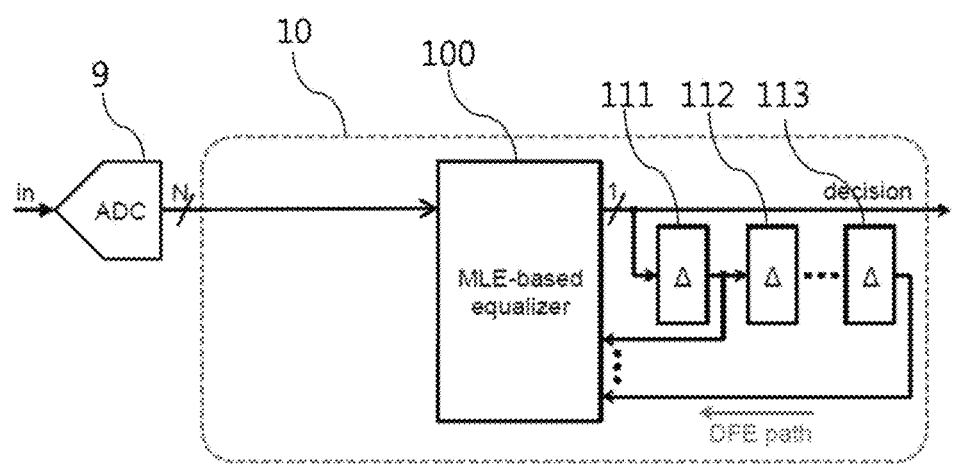
FIG. 1 is a diagram illustrating a digital equalizer.

Hereinafter, exemplary embodiments of the present invention will be described more fully with reference to the accompanying drawings for those skilled in the art to easily implement the present invention. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Reference numbers which have been explained in the prior description may be used in other drawings.

The size and thickness of the components shown the drawings are optionally determined for better understanding and ease of description, and the present invention is not limited to the examples shown in the drawings. In the drawings, thicknesses of several layers and regions may be exaggerated for clear expressions.

FIG. 1 is a diagram illustrating a digital equalizer.

A digital equalizer 10 may configure a part of a data receiver in a transceiver system. That is, the digital equalizer 10 may be located in the data receiver and output a decision value corresponding to reception data transmitted from a data transmitter.

In this case, the transceiver system may be a backplane communication system and the data receiver may be an analog to digital converter 9 based backplane receiver.

Data transmitted by a data transmitter in the transceiver system may pass through a channel and may be input to the digital equalizer via the analog to digital converter 9 of the data receiver.

The digital equalizer 10 may equalize the reception data in accordance with a decision feedback equalization (DFE) method. The reception data which is equalized to remove a noise therefrom may be output as a decision value which is a binary value represented by 0 or 1.

Referring to FIG. 1, the digital equalizer 10 may include a computing device 100 and at least one flip-flop 111, 112, or 113.

The plurality of flip-flops 111, 112, and 113 stores an adjacent bit sequence which is previous computing information. The previous computing information refers to information on decision values which are previously output by the computing device 100.

When it is assumed that a current decision value of the computing device 100 is a C-th bit, the flip-flop 111 has a C−1-th bit which is one time earlier decision value of the computing device 100 at an output end. The flip-flop 112 may have a C−2-th bit which is two times earlier decision value of the computing device 100 at an output end thereof. In this case, C may be a natural number.

As described above, a bit value which is an output of the flip-flop 111, a bit value which is an output of the flip-flop 112, a bit value which is an output of other flip-flops, and a bit value which is an output of the flip-flop 113 configure an adjacent bit sequence and are feedback as a second input of the computing device 100. In this exemplary scenario, a path through which the adjacent bit sequence is feedback as a second input is referred to as a DFE path. The number of flip-flops 111, 112, and 113 may determine the number of taps in the DFE path.

The computing device 100 receives an output value of the analog to digital converter 9 as a first input and receives the adjacent bit sequence as a second input. Further, the computing device 100 outputs a decision value which is a binary value by referring to a lookup table with respect to the first input and the second input. The decision value may correspond to the reception data.

For example, when the analog to digital converter 9 has an N bit output resolution, the analog to digital converter 9 may output an input voltage by dividing the input voltage by $2^N$ units. An output of the analog to digital converter 9 may be generally represented by ADC bins. As described above, the output value of the analog to digital converter 9 may configure a first input of the computing device 100. In this case, N may be a natural number.

The computing device 100 outputs a decision value which is a binary value by referring to the lookup table with respect to the above-described first input and second input. The computing device 100 may include a processor and the lookup table may be stored in a memory device. According to an exemplary scenario, the digital equalizer 10 may store the lookup table in a memory device which is installed in the computing device 100 or may store the lookup table in a memory device which is separated from the computing device 100.

According to an exemplary scenario, the lookup table may be calibrated or adapted in accordance with an environment variable such as a channel. The lookup table will be described below in detail with reference to FIGS. 2 and 3.

Figure 2:
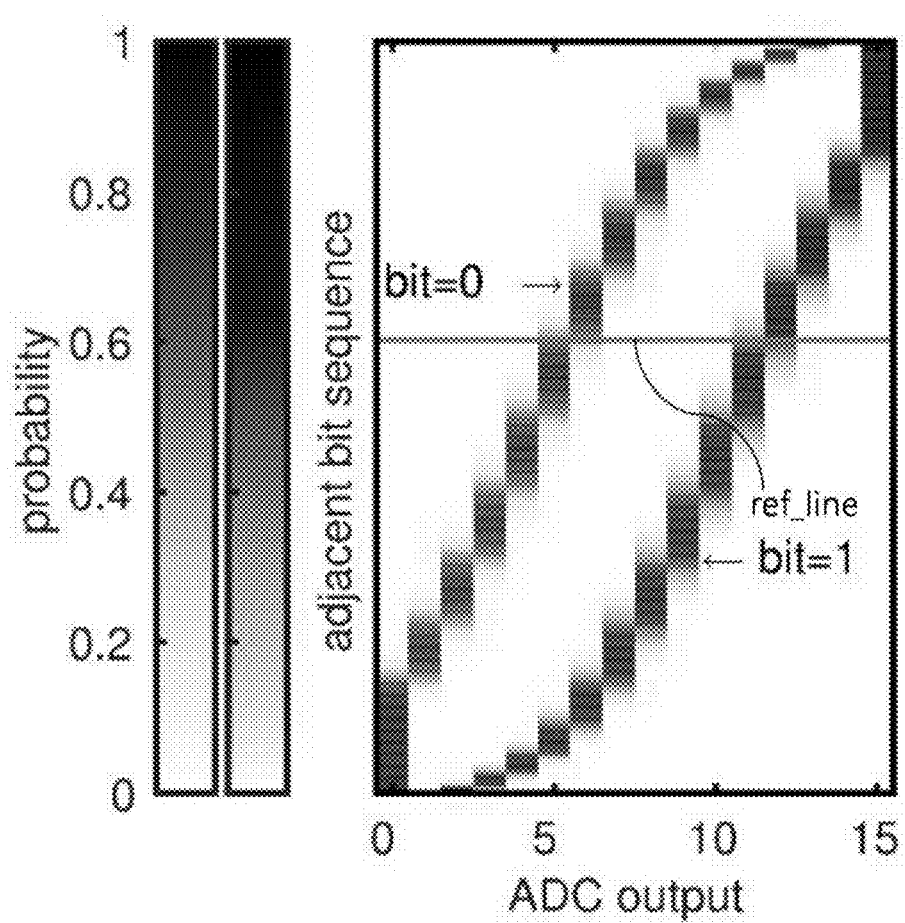
FIG. 2 is a view illustrating a lookup table.
Figure 3:
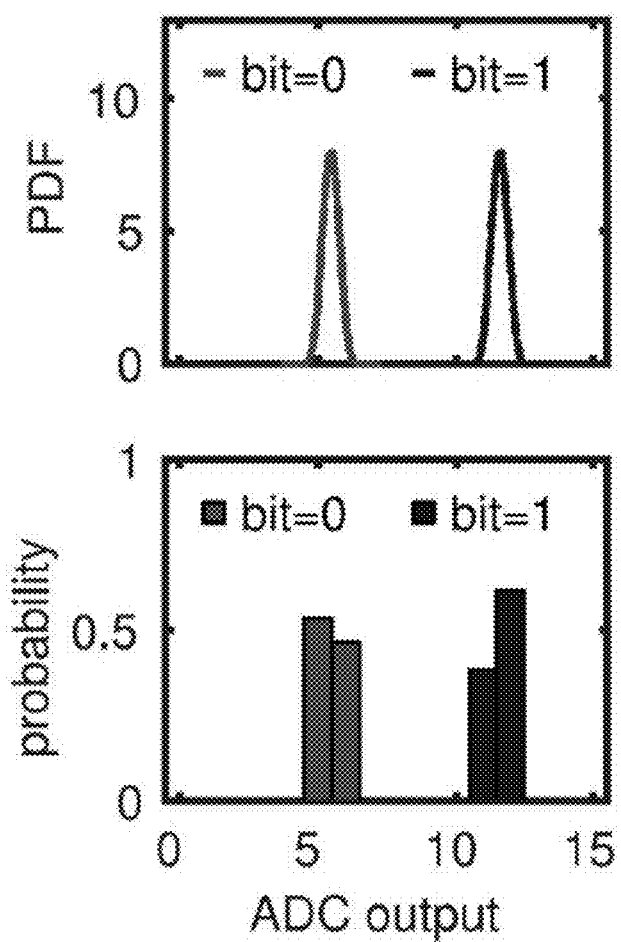
FIG. 3 is a view illustrating a probability density function and a discrete probability distribution corresponding to a reference line of FIG. 2.

FIG. 2 is a view illustrating a lookup table and FIG. 3 is a view illustrating a probability density function (PDF) and a discrete probability distribution (hit probability) corresponding to a reference line (ref_line) of FIG. 2.

In FIGS. 2 and 3, a lookup table is organized as a graph to visually explain the lookup table. An actual lookup table may be stored in the memory device as data.

In the graph of FIG. 2, a horizontal axis represents an output value of the analog to digital converter 9 which is a first input and a vertical axis represents an adjacent bit sequence which is a second input. In this exemplary scenario, it is assumed to use an analog to digital converter having four bit resolution as an example. Further, it is assumed that the digital equalizer 10 is a 9-tap DFE which includes nine flip-flops. Further, it is assumed that the adjacent bit sequence is configured by 9 bits.

The lookup table includes a plurality of first probability values in which reception data for a plurality of first inputs and a plurality of second inputs, respectively, has a first level of binary value and a plurality of second probability values in which reception data for the plurality of first inputs and the plurality of second inputs, respectively, has a second level of binary value.

Here, the first level of binary value may refer to a bit value 0 and the second level of binary value may refer to a bit value 1.

When the first probability value for the first input value and the second input value is equal to or higher than the second probability value, the computing device 100 outputs the first level of binary value as a decision value. This may be represented by the following Equation 1.

$$\text{decision} = \begin{cases} 0, & P(\text{bit}=0 \mid O=A, S=X) \geq P(\text{bit}=1 \mid O=A, S=X) \\ 1, & P(\text{bit}=0 \mid O=A, S=X) < P(\text{bit}=1 \mid O=A, S=X) \end{cases} \quad \text{[Equation 1]}$$

Referring to Equation 1, the first probability value P(bit=0|O=A,S=X) is a probability that when the first input value O is A and the second input value S is X, the reception data has a bit value 0. Further, the second probability value P(bit=1|O=A,S=X) is a probability that when the first input value O is A and the second input value S is X, the reception data has a bit value 1.

Referring to FIG. 2 again, with respect to a specific output value and a specific adjacent bit sequence of the analog to digital converter 9, a probability that the bit value of the reception data is 0 and a probability that the bit value of the reception data is 1 are sorted to be visually distinguished.

On the horizontal axis of the graph of FIG. 2, the output values of the analog to digital converter 9 are sorted in an ascending order, but on the vertical axis of the graph, the adjacent bit sequences are not sequentially sorted. On the vertical axis of the graph, the adjacent bit sequences are resorted such that the probability of the bit values with respect to the output value of the analog to digital converter 9 visually forms gradation. Referring to the leftmost side of FIG. 2, it is confirmed that as the gradation becomes darker, the probability of the bit value is closer to 1.

Referring to FIG. 2, it is intuitively and visually confirmed that as described in the first exemplary scenario of the present disclosure, when the output value and the adjacent bit sequence of the analog to digital converter 9 are used as a reference, the binary level of the reception data is probabilistically and definitely distinguished.

Referring to FIG. 3, a probability of the bit value in accordance with the output value of the analog to digital converter 9 with respect to an exemplary specific adjacent bit sequence corresponding to the reference line ref_line of FIG. 2 is confirmed.

The probability density function (PDF) is illustrated at an upper portion of FIG. 3 and a discrete probability distribution (hit probability) is illustrated at a lower portion of FIG. 3.

Referring to FIG. 3, when an exemplary specific adjacent bit sequence corresponding to the reference line ref_line is input to the computing device 100 as a second input, it is confirmed that if the output value of the analog to digital converter 9 is 5 or 6, a probability that the reception data has a bit value 0 is high and a probability that the reception data has a bit value 1 is very low. It is further confirmed that if the output value of the analog to digital converter 9 is 11 or 12, a probability that the reception data has a bit value 1 is high and a probability that the reception data has a bit value 0 is very low.

Therefore, for example, when 5 is input to the computing device 100 as the first input value and an exemplary specific adjacent bit sequence corresponding to the reference line ref_line is input as the second input value, the computing device 100 may output a bit value 0 as the decision value in accordance with Equation 1. Therefore, for example, when 12 is input to the computing device 100 as the first input value and an exemplary specific adjacent bit sequence corresponding to the reference line ref_line is input as the second input value, the computing device 100 may output a bit value 1 as the decision value in accordance with Equation 1.

The first probability value P(bit=0|O=A,S=X) may be expanded as represented in Equation 2.

$$P(\text{bit}=0 \mid O=A, S=X) = \qquad \text{[Equation 2]}$$
$$\frac{P(O=A, S=X \mid \text{bit}=0) \times P(\text{bit}=0)}{P(O=A, S=X)} =$$
$$\frac{P(O=A, S=X \mid \text{bit}=0) \times P(\text{bit}=0)}{P(O=A, S=X \mid \text{bit}=0) + P(O=A, S=X \mid \text{bit}=1)}$$

That is, the first probability value P(bit=0|O=A,S=X) may be determined by dividing a value obtained by multiplying a third probability value P(O=A,S=X|bit=0) that when the reception data has the first level of binary value, an output value of the analog to digital converter 9 is the first input value and the adjacent bit sequence is the second input value and a fourth probability value P(bit=0) that the reception data in random data is a first level of binary value by a value obtained by adding the third probability value P(O=A, S=X|bit=0) and a fifth probability value P(O=A,S=X|bit=1) that when the reception data has the second level of binary value, the output value of the analog to digital converter 9 is the first input value and the adjacent bit sequence is the second input value. Here, the fourth probability value P(bit=0) may be given to be 0.5.

Further, the second probability value may be expanded as represented in Equation 3.

$$P(\text{bit}=1 \mid O=A, S=X) = \qquad \text{[Equation 3]}$$
$$\frac{P(O=A, S=X \mid \text{bit}=1) \times P(\text{bit}=1)}{P(O=A, S=X)} =$$
$$\frac{P(O=A, S=X \mid \text{bit}=1) \times P(\text{bit}=1)}{P(O=A, S=X \mid \text{bit}=0) + P(O=A, S=X \mid \text{bit}=1)}$$

That is, the second probability value may be determined by dividing a value obtained by multiplying the fifth probability value P(O=A,S=X|bit=1) and a sixth probability value P(bit=1) that the reception data in the random data has the second level of binary value by a value obtained by adding the third probability value P(O=A,S=X|bit=0) and the fifth probability value P(O=A,S=X|bit=1). Here, the sixth probability value P(bit=1) may be given to be 0.5.

Therefore, when the third probability value and the fifth probability value which are currently unknown numbers are obtained, the first probability value and the second probability value deducted from Equations 2 and 3 are stored or updated in the lookup table. Therefore, the computing device 100 performs the above-described function by referring to the lookup table.

The third probability value and the fifth probability value, for example, may be obtained by making the output values and the adjacent bit sequence of the analog to digital converter 9 output from the data receiver when the data transmitter transmits a predetermined or predefined bit sequence during a calibration step or an adaption step for a channel and a data transmitting/receiving environment before transmitting actual data as a database. Further, an impulse response of the channel may be used.

Therefore, the computing device 100 may operate as a nonlinear equalizer based on maximum likelihood estimation (MLE) algorithm.

Figure 4:
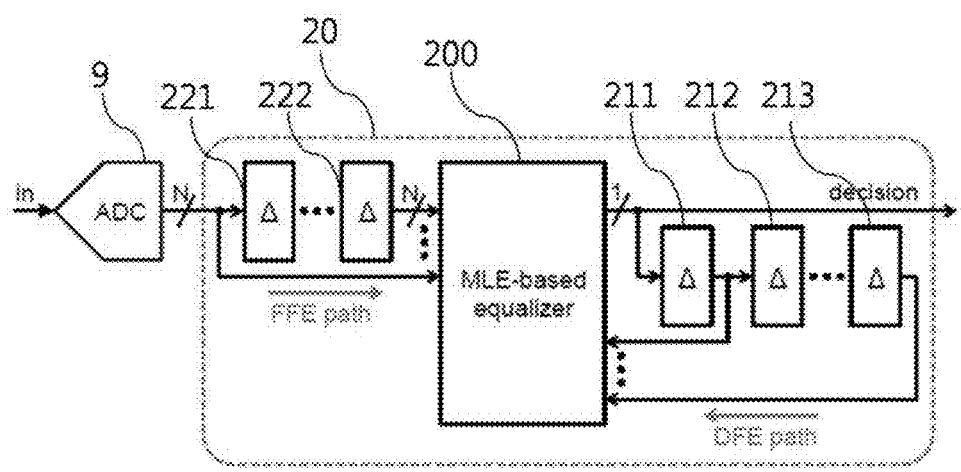
FIG. 4 is a diagram illustrating a digital equalizer.

FIG. 4 is a diagram illustrating a digital equalizer.

Referring to FIG. 4, the digital equalizer 20 includes a computing device 200, flip-flops 211, 212, and 213, and registers 221 and 222.

Since the flip-flops 211, 212, and 213 which configure a DFE path performs a function similar to that of the above-described flip-flops 111, 112, and 123. Therefore, description thereof will be omitted.

The registers 221 and 222 are located between an output end of the analog to digital converter 9 and a first input end of the computing device 200 and configure a feed-forward equalization path (FFE path). The number of registers 221 and 222 may determine the number of taps of the FFE path.

The computing device 200 receives a target output value of the analog to digital converter 9 after passing through the register 222 as a first input value. The computing device 200 further receives a next output value of the analog to digital converter 9 before passing through the register 222 as a third input value.

Similarly to the first exemplary scenario, the computing device 200 may receive the adjacent bit sequence through the DFE path from the flip-flops 211, 212, and 213 as the second input value.

The output value of the register 222 which is connected to the first input end of the computing device 200 is the target output value of the analog to digital converter 9 and a decision value corresponding to the output value of the register 222 is output from the computing device 200.

A first next output value of the analog to digital converter 9 for one time after the target output value may be stored in the first register which is connected to the input end of the register 222. A second next output value of the analog to digital converter 9 for two times after the target output value may be stored in the second register which is connected to the input end of the first register. A latest next output value of the analog to digital converter 9 may be stored in the input end of the register 221. These next output values may be transmitted as the third input value of the computing device 200 through the FFE path.

The computing device 200 outputs a decision value which is a binary value by referring to the lookup table with respect to the above-described first input value, second input value, and third input value. The computing device 200 may include a processor and the lookup table may be stored in a memory device. According to an exemplary scenario, the digital equalizer 20 may store the lookup table in a memory device which is installed in the computing device 200 or may store the lookup table in a memory device which is separated from the computing device 200.

According to an exemplary scenario, the lookup table may be calibrated or adapted in accordance with an environment variable such as a channel. The lookup table will be described below in detail with reference to FIG. 5.

Figure 5:
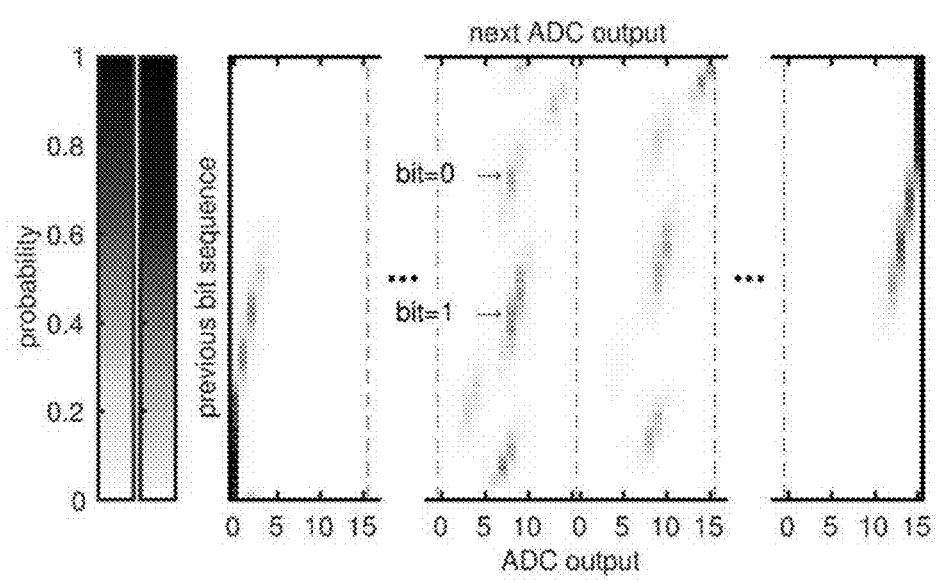
FIG. 5 is a view illustrating a lookup table.

FIG. 5 is a view illustrating a look-up table.

In FIG. 5, a lookup table is organized as a graph to visually explain the lookup table. Actual lookup table may be stored in the memory device as data.

A lower horizontal axis of the graph of FIG. 5 represents a target output value of the analog to digital converter 9 which is a first input value, an upper horizontal value represents a next output value of the analog to digital converter 9 which is a third input value, and a vertical axis represents an adjacent bit sequence of the analog to digital converter 9 which is a second input value.

In Equation which will be described below, including FIG. 5, it is assumed that a digital equalizer 20 includes one register and nine flip-flops, that is, 1-tap FFE+9-tap DFE. It is assumed that the analog to digital converter 9 has 4 bit resolution.

The lookup table may include a plurality of seventh probability values that reception data for a plurality of first input values, a plurality of second input values, and a plurality of third input values, respectively, has a first level of binary value and a plurality of eighth probability values that reception data for the plurality of first input values, the plurality of second input values, and the plurality of third input values, respectively, has a second level of binary value.

Here, the first level of binary value may refer to a bit value 0 and the second level of binary value refers to a bit value 1.

When the seventh probability value for the first input values, the second input values, and the third input values is equal to or higher than the eighth probability value, the computing device 200 may output the first level of binary value as a decision value. This may be represented by the following Equation 4.

$$\text{decision} = \begin{cases} 0, & P(\text{bit}=0 \mid O=A, N=B, S=X) \geq P\begin{pmatrix} \text{bit}=1 \mid O=A, \\ N=B, S=X \end{pmatrix} \\ 1, & P(\text{bit}=0 \mid O=A, N=B, S=X) < P\begin{pmatrix} \text{bit}=1 \mid O=A, \\ N=B, S=X \end{pmatrix} \end{cases}$$
[Equation 4]

Referring to Equation 4, the seventh probability value $P(\text{bit}=0 \mid O=A, N=B, S=X)$ is a probability that when the first input value O is A, the second input value S is X, and the third input value N is B, the reception data has a bit value 0. Further, the eighth probability value $P(\text{bit}=1 \mid O=A, N=B, S=X)$ is a probability that when the first input value O is A, the second input value S is X, and the third input value N is B, the reception data has a bit value 1.

Referring to FIG. 5 again, with respect to a specific target output value, a specific next output value, and a specific adjacent bit sequence of the analog to digital converter 9, a probability that the bit value of the reception data is 0 and a probability that the bit value of the reception data is 1 are sorted to be visually distinguished.

On the lower horizontal axis of the graph of FIG. 5, the target output values of the analog to digital converter are sorted in the ascending order. However, on the upper horizontal axis of the graph, the next output values are not necessarily sorted in the ascending order. Further, on the vertical axis of the graph, the adjacent bit sequences are not necessarily sequentially sorted.

For example, on the lower horizontal axis of the graph, 0 to 15 which are 4 bit of target output values of the analog to digital converter 9 are fixedly labeled.

In contrast, for example, on the upper horizontal axis, in a first graph, the next output values may be labeled by 0 to 15. In a second graph, the next output values may be labeled by 1 to 15 and 0. In a third graph, the next output values are labeled by 2 to 15 and 0 to 1. In a sixteenth graph, the next output values are labeled by 15 and 0 to 14.

Further, for example, on the vertical axis of the graph, the adjacent bit sequences may be resorted such that the probability of the bit values with respect to the target output value and the next output value of the analog to digital converter 9 visually forms gradation. Referring to the left side of FIG. 5, it is confirmed that as the gradation becomes darker, the probability of the bit value is closer to 1.

As described above, FIG. 5 is a visual representation for explaining the lookup table but does not limit a data structure.

Referring to FIG. 5, it is intuitively and visually confirmed that as described in the second exemplary scenario of the present disclosure, when the target output value, the next output value, and the adjacent bit sequence are used as a reference, the binary level of the reception data is probabilistically and definitely distinguished.

The seventh probability value P(bit=0|O=A,N=B,S=X) may be expanded as represented in Equation 5.

$$P(\text{bit} = 0 \mid O = A, N = B, S = X) = \frac{P(O = A, N = B, S = X \mid \text{bit} = 0) \times P(\text{bit} = 0)}{P(O = A, N = B, S = X \mid \text{bit} = 0) + P(O = A, N = B, S = X \mid \text{bit} = 1)} \quad [\text{Equation 5}]$$

That is, the seventh probability value P(bit=0|O=A,N=B, S=X) may be determined by dividing a value obtained by multiplying a ninth probability value P(O=A,N=B, S=X|bit=0) that when the reception data has a first level of binary value, the target output value of the analog to digital converter 9 is the first input value, the adjacent bit sequence is the second input value, and the next output value of the analog to digital converter is the third input and a tenth probability value P(bit=0) that reception data in random data has the first level of binary value by a value obtained by adding the ninth probability value P(O=A,N=B,S=X|bit=0) and an eleventh probability value P(O=A,N=B,S=X|bit=1) that when the reception data has a second level of binary value, the target output value of the analog to digital converter 9 is the first input value, the adjacent bit sequence is the second input value, and the next output value of the analog to digital converter 9 is the third input. Here, the tenth probability value P(bit=0) may be given to be 0.5.

Further, the eighth probability value P(bit=1|O=A,N=B, S=X) may be expanded as represented in Equation 6.

$$P(\text{bit} = 1 \mid O = A, N = B, S = X) = \frac{P(O = A, N = B, S = X \mid \text{bit} = 1) \times P(\text{bit} = 1)}{P(O = A, N = B, S = X \mid \text{bit} = 0) + P(O = A, N = B, S = X \mid \text{bit} = 1)} \quad [\text{Equation 6}]$$

That is, the eighth probability value P(bit=1|O=A,N=B, S=X) may be determined by dividing a value obtained by multiplying the eleventh probability value P(bit=1|O=A, N=B,S=X) and a twelfth probability value P(bit=1) that the reception data in the random data has the second level of binary value by a value obtained by adding the ninth probability value P(O=A,N=B,S=X|bit=0) and the eleventh probability value P(O=A,N=B,S=X|bit=1). Here, the twelfth probability value P(bit=1) may be given to be 0.5.

Therefore, when the ninth probability value and the eleventh probability value which are currently unknown numbers are obtained, the seventh probability value and the eighth probability value deducted from Equations 5 and 6 are stored or updated in the lookup table. Therefore, the computing device 200 performs the above-described function by referring to the lookup table.

The ninth probability value P(O=A,N=B,S=X|bit=0) may be expanded as represented in Equation 7.

$$\begin{aligned} P(O = A, N = B, S = X \mid \text{bit} = 0) = & \quad [\text{Equation 7}] \\ P(O = A, N = B, S = X, \text{bitN} = 0 \mid \text{bit} = 0) + & \\ P(O = A, N = B, S = X, \text{bitN} = 1 \mid \text{bit} = 0) = & \\ P(O = A, N = B, S = X \mid \text{bitN} = 0, \text{bit} = 0) \times & \\ P(\text{bitN} = 0) + P(O = A, N = B, & \\ S = X \mid \text{bitN} = 1, \text{bit} = 0) \times P(\text{bitN} = 1) & \end{aligned}$$

That is, the ninth probability value P(O=A,N=B, S=X|bit=0) may be determined by adding a value obtained by multiplying a thirteenth probability value P(O=A,N=B, S=X|bitN=0, bit=0) that when the reception data has the first level of binary value and the next reception data has the first level of binary value, the target output value of the analog to digital converter 9 is a first input value, the adjacent bit sequence is the second input value, and the next output value of the analog to digital converter 9 is the third input and a fourteenth probability value P(bitN=0) that the next reception data in the random data has the first level of binary value and a value obtained by multiplying a fifteenth probability value P(O=A,N=B,S=X|bitN=1, bit=0) that when the reception data has the first level of binary value and the next reception data has the second level of binary value, the target output value of the analog to digital converter 9 is a first input value, the adjacent bit sequence is the second input value, and the next output value of the analog to digital converter 9 is the third input and a sixteenth probability value P(bitN=1) that the next reception data in the random data has the second level of binary value. Here, the fourteenth probability value P(bitN=0) and the sixteenth probability value P(bitN=1) may be given to be 0.5, respectively. bitN refers to a binary level of the next reception data and may correspond to a next output value N.

The eleventh probability value P(O=A,N=B,S=X|bit=1) may be expanded as represented in the following Equation 8.

$$\begin{aligned} P(O = A, N = B, S = X \mid \text{bit} = 1) = & \quad [\text{Equation 8}] \\ P(O = A, N = B, S = X, \text{bitN} = 0 \mid \text{bit} = 1) + & \\ P(O = A, N = B, S = X, \text{bitN} = 1 \mid \text{bit} = 1) = & \\ P(O = A, N = B, S = X \mid \text{bitN} = 0, \text{bit} = 1) \times & \\ P(\text{bitN} = 0) + P(O = A, N = B, & \\ S = X \mid \text{bitN} = 1, \text{bit} = 1) \times P(\text{bitN} = 1) & \end{aligned}$$

That is, the eleventh probability value P(O=A,N=B, S=X|bit=1) may be determined by adding a value obtained by multiplying a seventeenth probability value P(O=A,N=B, S=X|bitN=0, bit=1) that when the reception data has the second level of binary value and the next reception data has the first level of binary value, the target output value of the analog to digital converter 9 is the first input value, the adjacent bit sequence is the second input value, and the next output value of the analog to digital converter 9 is the third input and the fourteenth probability value P(bitN=0) and a value obtained by multiplying an eighteenth probability value P(O=A,N=B,S=X|bitN=1, bit=1) that when the reception data has the second level of binary value and the next reception data has the second level of binary value, the target output value of the analog to digital converter 9 is the first input value, the adjacent bit sequence is the second input value, and the next reception data of the analog to digital converter 9 is the third input and the sixteenth probability value P(bitN=1).

Therefore, when the thirteenth probability value and the fifteenth probability value which are currently unknown numbers are obtained, the ninth probability value may be deducted using Equation 7. Further, when the seventeenth probability value and the eighteenth probability value which are currently unknown numbers are obtained, the eleventh probability value may be deducted using Equation 8. As described above, when the ninth probability value and the eleventh probability value are obtained, the seventh probability value and the eighth probability value deducted from Equations 5 and 6 are stored or updated in the lookup table. Therefore, the computing device 200 performs the above-described function by referring to the lookup table.

The thirteenth probability value, the fifteenth probability value, the seventeenth probability value, and the eighteenth probability value may be obtained by making the output values and the adjacent bit sequence of the analog to digital converter 9 output from the data receiver when the data transmitter transmits a predetermined or predefined bit sequence during a calibration step or an adaption step for a channel and a data transmitting/receiving environment before transmitting actual data as a database. Further, an impulse response of the channel may be used.

Figure 6:
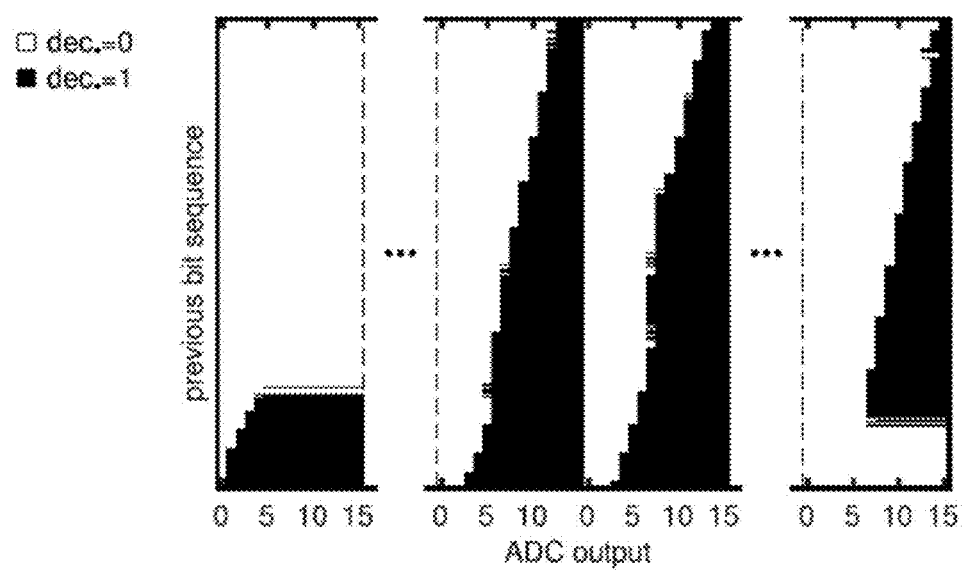
FIG. 6 is a view illustrating exemplary bit decision.

FIG. 6 is a view illustrating exemplary bit decision.

Referring to FIG. 6, an exemplary bit decision value which is output to the lookup table represented in FIG. 5 by the computing device 200 is illustrated as a bit value 0 or a bit value 1.

Figure 7:
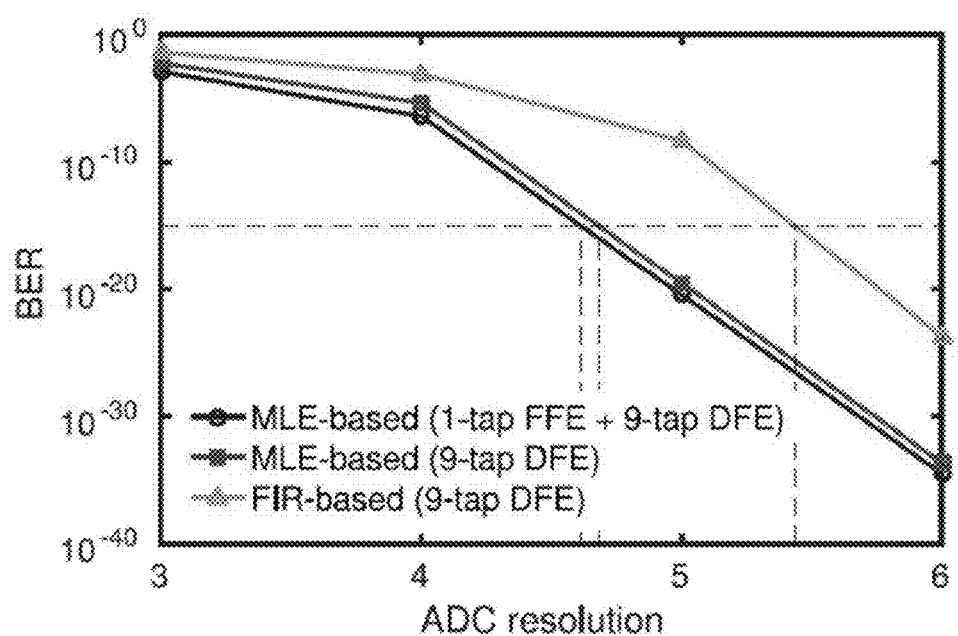
FIG. 7 is a view illustrating a BER simulated with respect to a resolution of an analog to digital converter.

FIG. 7 is a view illustrating a BER simulated with respect to a resolution of an analog to digital converter.

In order to evaluate the digital equalizer 10 and the digital equalizer 20, a system-level simulation based on high-level models of a high-speed link system is performed using a MATLAB.

Since the high-level model assumes an ideal front-end analog to digital converter (ADC) which does not have nonlinearity, in an actual system, an analog to digital converter having a resolution which is one or two bits higher than that described in the exemplary scenario may be requested to obtain a similar performance. In the simulation, data transmission at a speed of 20 Gbps which traverses a 20-inch bottom channel is assumed.

Referring to FIG. 7, performances of an MLE type digital equalizer 10 configured by 9-tap DFE, an MLE type digital equalizer 20 configured by 1-tap FFE+9-tap DFE, and an FIR type digital equalizer of the related art configured by 9-tap DFE are compared.

As illustrated in the drawing, the digital equalizer 10 and the digital equalizer 20 exhibit an excellent bit error rate (BER) performance as compared with the digital equalizer of the related art. For example, when the resolution of the analog to digital converter is 5 bits, the digital equalizers 10 and 20 show a BER performance which is $10^{10}$ times improved.

When a target BER is $10^{-15}$, the digital equalizers 10 and 20 may reduce a requested resolution of the analog to digital converter by 0.8 bits. This means that implementation overhead may be 40% or more reduced. Downsizing of the analog to digital converter may simultaneously achieve reduced power consumption and improved speed (for example, input bandwidth and sampling rate).

Further, it is confirmed that the BER performance of the digital equalizer 20 is 10 times improved as compared with the BER performance of the digital equalizer 10. When the channel includes a larger pre-cursor ISI element (for example, top channels), the performance by the FFE may be significantly improved. Here, the ISI (intersymbol interference) refers to interference between symbols generated by a post cursor or a precursor of a previous signal or a post signal.

The ISI is caused by imperfection of a channel such as loss, bandwidth limitation, and reflection. The ISI may seriously harm the signal integrity of the high speed link system.

The ISI may be represented by a function of previous and next bit sequences. The digital equalizers 10 and 20 create a group of information of the adjacent bit sequence and information of the next output value of the analog to digital converter 9 to use the information in order to determine a decision value. Therefore, there is an advantage in that the influence of the precursor and post cursor ISI elements may be canceled.

The above-referred drawings and the detailed description of the present disclosure are provided for illustrative purposes only but not intended to limit the scope of the present disclosure described in the appending claims. Therefore, it will be appreciated to those skilled in the art that various modifications are made and other equivalent embodiments are available. Accordingly, the actual scope of the present invention must be determined by the spirit of the appended claims.

What is claimed is:

1. A digital equalizer which outputs a decision value corresponding to reception data transmitted from a data transmitter and is located in a data receiver, the digital equalizer comprising:
   at least one flip-flop which stores an adjacent bit sequence which is previous computing information; and
   a computing device which receives an output value of an analog to digital converter as a first input value, receives the adjacent bit sequence as a second input value, and outputs the decision value which is a binary value by referring to a lookup table with respect to the first input value and the second input value.

2. The digital equalizer according to claim 1, wherein the lookup table includes:
   a plurality of first probability values that the reception data for a plurality of first input values and a plurality of second input values, respectively, is a first level of binary value; and a plurality of second probability values that the reception data for the plurality of first input values and the plurality of second input values, respectively, is a second level of binary value.

3. The digital equalizer according to claim 2, wherein when a first probability value of the plurality of first probability values for the first input value and the second input value is equal to or higher than a second probability value of the plurality of second probability values the computing device outputs the first level of binary value as the decision value.

4. The digital equalizer according to claim 3, wherein the first probability value is determined by dividing a value obtained by multiplying a third probability value that when the reception data has the first level of binary value, an output value of the analog to digital converter is the first input value and the adjacent bit sequence is the second input value and a fourth probability value that the reception data in random data has the first level of binary value by a value obtained by adding the third probability value and a fifth probability value that when the reception data has the second level of binary value, the output value of the analog to digital converter is the first input value and the adjacent bit sequence is the second input value.

5. The digital equalizer according to claim 4, wherein the second probability value is determined by dividing a value obtained by multiplying the fifth probability value and a sixth probability value that the reception data in the random data has the second level of binary value by a value obtained by adding the third probability value and the fifth probability value.

6. The digital equalizer according to claim 1, further comprising:
    at least one register which is located between an output end of the analog to digital converter and a first input end of the computing device.

7. The digital equalizer according to claim 6, wherein the computing device receives a target output value of the analog to digital converter after passing through the at least one register as the first input value, and further receives a next output value of the analog to digital converter before passing through the at least one register as a third input value.

8. The digital equalizer according to claim 7, wherein the lookup table includes:
    a plurality of seventh probability values that reception data for a plurality of first input values, a plurality of second input values, and a plurality of third input values, respectively, has a first level of binary value; and
    a plurality of eighth probability values that reception data for the plurality of first input values, the plurality of second input values, and the plurality of third input values, respectively, has a second level of binary value.

9. The digital equalizer according to claim 8, wherein when the seventh probability value for the first input values, the second input values, and the third input values is equal to or higher than the eighth probability value, the computing device outputs the first level of binary value as the decision value.

10. The digital equalizer according to claim 9, wherein the seventh probability value is determined by dividing a value obtained by multiplying a ninth probability value that when the reception data has the first level of binary value, the target output value of the analog to digital converter is the first input value, the adjacent bit sequence is the second input value, and the next output value of the analog to digital converter is the third input and a tenth probability value that reception data in random data has the first level of binary value by a value obtained by adding the ninth probability value and an eleventh probability value that when the reception data has the second level of binary value, the target output value of the analog to digital converter is the first input value, the adjacent bit sequence is the second input value, and the next output value of the analog to digital converter is the third input.

11. The digital equalizer according to claim 10, wherein the eighth probability value is determined by dividing a value obtained by multiplying the eleventh probability value and a twelfth probability value that the reception data in the random data has the second level of binary value by a value obtained by adding the ninth probability value and the eleventh probability value.

12. The digital equalizer according to claim 11, wherein the ninth probability value is determined by adding a value obtained by multiplying a thirteenth probability value that when the reception data has the first level of binary value and the next reception data has the first level of binary value, the target output value of the analog to digital converter is a first input value, the adjacent bit sequence is the second input value, and the next output value of the analog to digital converter is the third input and a fourteenth probability value that the next reception data in the random data has the first level of binary value and a value obtained by multiplying a fifteenth probability value that when the reception data has the first level of binary value and the next reception data has the second level of binary value, the target output value of the analog to digital converter is the first input value, the adjacent bit sequence is the second input value, and the next output value of the analog to digital converter is the third input and a sixteenth probability value that the next reception data in the random data has the second level of binary value.

13. The digital equalizer according to claim 12, wherein the eleventh probability value is determined by adding a value obtained by multiplying a seventeenth probability value that when the reception data has the second level of binary value and the next reception data has the first level of binary value, the target output value of the analog to digital converter is the first input value, the adjacent bit sequence is the second input value, and the next output value of the analog to digital converter is the third input and the fourteenth probability value and a value obtained by multiplying an eighteenth probability value that when the reception data has the second level of binary value and the next reception data has the second level of binary value, the target output value of the analog to digital converter is the first input value, the adjacent bit sequence is the second input value, and the next reception data of the analog to digital converter is the third input and the sixteenth probability value.

* * * * *